(12) United States Patent
Kita

(10) Patent No.: US 10,787,157 B2
(45) Date of Patent: Sep. 29, 2020

(54) VEHICLE BRAKE SYSTEM

(71) Applicant: TOYOTA JIDOSHA KABUSHIKI KAISHA, Toyota-shi, Aichi-ken (JP)

(72) Inventor: Shinya Kita, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/838,468

(22) Filed: Dec. 12, 2017

(65) Prior Publication Data

US 2018/0215363 A1    Aug. 2, 2018

(30) Foreign Application Priority Data

Feb. 1, 2017    (JP) ................. 2017-016774

(51) Int. Cl.
*B60T 13/20* (2006.01)
*B60T 13/74* (2006.01)
*B60T 7/04* (2006.01)
*F16D 61/00* (2006.01)
*B60T 1/10* (2006.01)
(Continued)

(52) U.S. Cl.
CPC ............. *B60T 13/20* (2013.01); *B60T 1/10* (2013.01); *B60T 7/042* (2013.01); *B60T 13/146* (2013.01); *B60T 13/161* (2013.01); *B60T 13/168* (2013.01); *B60T 13/662* (2013.01); *B60T 13/686* (2013.01); *B60T 13/741* (2013.01); *B60T 13/745* (2013.01); *F16D 61/00* (2013.01); *B60T 2270/60* (2013.01); *B60T 2270/88* (2013.01)

(58) Field of Classification Search
CPC ...... B60T 13/20; B60T 13/161; B60T 13/168; B60T 13/745; B60T 13/146; B60T 13/662; B60T 13/686; B60T 13/741; B60T 1/10; B60T 7/042; B60T 2270/60; B60T 2270/88; F16D 61/00
See application file for complete search history.

(56) References Cited

U.S. PATENT DOCUMENTS 6,027,429 A * 2/2000 Daniels .............. A63B 21/0056
                                                      482/111
6,844,698 B1    1/2005 Kwon et al.
(Continued)

FOREIGN PATENT DOCUMENTS

CN    1250729 A    4/2000
CN    1390380 A    1/2003
(Continued)

*Primary Examiner* — Melody M Burch
(74) *Attorney, Agent, or Firm* — Sughrue Mion, PLLC

(57) ABSTRACT

A vehicle brake system including a hydraulic brake device that includes: a brake actuator including a pump and a two-system electric motor that includes first and second coils; a battery; a first drive circuit for supplying electric power from the battery to the first coil; a capacitor; and a second drive circuit for supplying electric power from the capacitor to the second coil, wherein, in a normal mode in which the pump is driven by power not greater than set power, the motor drives the pump by the electric power supplied from the battery to the first coil, and wherein, in a high power mode in which the pump is driven by power that exceeds the set power, the motor drives the pump by both of the electric power supplied from the battery to the first coil and the electric power supplied from the capacitor to the second coil.

12 Claims, 7 Drawing Sheets

(51) Int. Cl.
*B60T 13/66* (2006.01)
*B60T 13/14* (2006.01)
*B60T 13/68* (2006.01)
*B60T 13/16* (2006.01)

(56) References Cited

U.S. PATENT DOCUMENTS

| | | |
|---|---|---|
| 6,913,326 B1 | 7/2005 | Ohkubo et al. |
| 2007/0114844 A1 | 5/2007 | Maki et al. |
| 2010/0252345 A1* | 10/2010 | Hoshino .................. B60L 7/18 180/65.31 |
| 2013/0082514 A1* | 4/2013 | Murakami ............ B60T 13/686 303/14 |
| 2013/0253781 A1* | 9/2013 | Li ........................... B60L 8/003 701/50 |
| 2014/0129068 A1* | 5/2014 | Higa ...................... B60K 6/445 701/22 |
| 2014/0131150 A1* | 5/2014 | Nimura .................. B60L 1/003 188/158 |
| 2014/0169919 A1* | 6/2014 | Ablabutyan ........... H02H 7/222 414/471 |

FOREIGN PATENT DOCUMENTS

| | | |
|---|---|---|
| JP | 2003-514496 A | 4/2003 |
| JP | 2007-137258 A | 6/2007 |
| JP | 2016-149935 A | 8/2016 |
| WO | 2013/008298 A1 | 1/2013 |

\* cited by examiner

VEHICLE BRAKE SYSTEM

CROSS REFERENCE TO RELATED APPLICATION

The present application claims priority from Japanese Patent Application No. 2017-016774, which was filed on Feb. 1, 2016, the disclosure of which is herein incorporated by reference in its entirety.

BACKGROUND

Technical Field

The present disclosure relates to a brake system installed on a vehicle.

Description of Related Art

Recent vehicle brake systems, in general, include a hydraulic brake device configured to generate a hydraulic braking force which is a braking force that depends on a pressure of a working fluid. Various types of such systems are known as described in JP-A-2007-137258, for instance.

SUMMARY

The hydraulic brake device is required to have high responsiveness. That is, it is demanded that a hydraulic braking force to be generated quickly follow an increase in a required hydraulic braking force. Such a demand is high in the so-called sudden braking. In a brake device not equipped with an accumulator such as the device disclosed in JP-A-2007-137258, namely, in a brake device not configured to store a high-pressure working fluid, high responsiveness is not ensured because the high-pressure working fluid starts to be supplied by driving the pump when the hydraulic braking force is needed. Thus, the present disclosure relates to a vehicle brake system equipped with a hydraulic brake device that ensures high responsiveness.

In one aspect of the present disclosure, a vehicle brake system includes a hydraulic brake device, wherein an electric motor configured to drive a pump as a high-pressure source is a two-system motor including two coils, and the hydraulic brake device includes, as a power source for operating the electric motor, a battery and a capacitor. In a normal mode in which output power from the electric motor need not be large, the pump is driven by electric power from the battery. In a high power mode in which relatively large output power from the electric motor is needed, the pump is driven by both of the electric power from the battery and electric power from the capacitor.

According to the vehicle brake system constructed as described above, the hydraulic brake device is configured such that driving of the pump by the electric motor is assisted by the electric power from the capacitor in a situation in which the pump is desired to be driven by relatively large power. It is thus possible to achieve a vehicle brake system equipped with a hydraulic brake device that ensures high responsiveness.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention. Various forms of the claimable invention may become an invention described in claims.

(1) A vehicle brake system comprising a hydraulic brake device that includes a wheel brake provided for a wheel and a brake actuator configured to supply, to the wheel brake, a working fluid having a pressure in accordance with a required hydraulic braking force, wherein the brake actuator includes a pump as a high-pressure source and an electric motor which is configured to drive the pump and which is a two-system motor including a first coil and a second coil, wherein the hydraulic brake device further includes: a battery; a first drive circuit for supplying electric power from the battery to the first coil of the electric motor; a capacitor; and a second drive circuit for supplying electric power from the capacitor to the second coil of the electric motor, wherein, in a normal mode in which the pump is driven by power not greater than set power, the electric motor drives the pump by the electric power supplied from the battery to the first coil, and wherein, in a high power mode in which the pump is driven by power that exceeds the set power, the electric motor drives the pump by both of the electric power supplied from the battery to the first coil and the electric power supplied from the capacitor to the second coil.

This form is a basic form of the claimable invention. In this form, the electric motor is a two-system motor including the two coils, and the hydraulic brake device includes two power sources and two drive circuits corresponding to the respective two coils. The "two-system motor" is a motor whose output shaft (motor shaft) can be moved by electric power supplied to any one of the two coils or by electric power supplied simultaneously to the two coils. The "drive circuit" may be an inverter or the like in an instance where the electric motor is operated by AC electricity and may be a mere switching circuit or the like in an instance where the electric motor is operated by DC electricity. The so-called brushless DC motor may be regarded as an AC motor operated by an inverter as the drive circuit. The battery and the capacitor, each as the power source, are different in capacity. In the battery, such as a lead-acid battery, a nickel-metal hydride battery or a lithium-ion secondary battery, charging and discharging involve chemical reactions. In the capacitor, such as a condenser, charging and discharging do not involve chemical reactions, so as to ensure quick charging and discharging.

In the brake actuator, two operation modes, i.e., a normal mode and a high power mode, are set as an operation mode (drive mode) of the pump as the high-pressure source. The two modes are different in drive power of the pump. In other words, the two modes are different in amount of electric current supplied to the coils in an instance where the amount of electric power for driving the pump is the same, namely, the drive voltage is the same. Consequently, "power" relating to driving of the pump means, in a broad sense, electric power supplied to the electric motor.

When it is needed to brake suddenly, for instance, the working fluid has to be quickly supplied, at an early stage, to the wheel brake from the pump as the high-pressure source, in order to enable a quick response of the hydraulic braking force. In this case, the pump needs to be driven by larger power, and the electric power needs to be supplied to the electric motor from the battery via the first drive circuit. This may cause a risk that the electric power becomes excessively large. In this case, the state of the battery may become unstable or operating conditions of other devices may be adversely influenced if other devices are being operated by the electric power supplied from the battery. Conversely, the supply of the electric power from the battery has to be inevitably restricted in consideration of the state of the battery and the adverse influence on other devices, so that the responsiveness of the hydraulic braking force, i.e., the responsiveness of the hydraulic brake device, may deteriorate.

According to this form, in the high power mode in which the pump needs to be driven by large power, the electric motor is operated also by the electric power supplied from the capacitor via the second drive circuit. Thus, the pump can be driven by large power while the supply of the electric power from the battery is restricted. According to this form, the electric power supplied from the battery does not become excessively large in sudden braking or the like, and driving of the pump by the motor is assisted by the electric power supplied from the capacitor. It is thus possible to provide the hydraulic brake device capable of generating the hydraulic braking force having good responsiveness, so that the vehicle brake system having good responsiveness is constructed.

(2) The vehicle brake system according to the form (1), wherein a part of the power by which the pump is driven in the high power mode is covered by the electric power supplied from the capacitor to the second coil, the part of the power corresponding to an excess amount beyond the set power.

This form may be construed as a form in which an upper limit is set for the electric power supplied from the battery to the electric motor in the high power mode. By setting the upper limit, it is possible to sufficiently obviate the unstable state of the battery and the adverse influence on other devices. At the same time, the electric power is permitted to be supplied from the battery up to the upper limit, thereby minimizing the electric power supplied from the capacitor in the high power mode.

(3) The vehicle brake system according to the form (1) or (2), wherein the hydraulic brake device is configured such that the pump is driven by the electric power supplied from the capacitor to the second coil when the battery is in failure.

According to this form, in the event of failure of the battery in the normal mode, the failure is handled by supplying the electric power from the capacitor. It is thus possible to construct the vehicle brake system which is excellent from the viewpoint of failsafe. It is noted that switching from the normal mode to the high power mode is prohibited in the event of failure of the battery. Conversely, in an instance where the hydraulic brake device is equipped with a backup system for handling the failure of the battery constituted by the second coil of the two-system motor, the capacitor, and the second drive circuit, this faun enables the high power mode to be established utilizing the backup system. That is, in the vehicle brake system of this form, the driving of the pump by the motor is assisted by the electric power supplied from the capacitor through the use of the equipped system.

(4) The vehicle brake system according to any one of the forms (1)-(3),
wherein the hydraulic brake device further includes a third drive circuit for supplying electric power from the battery to the second coil of the electric motor, and
wherein the hydraulic brake device is configured such that, when the first drive circuit is in failure, the third drive circuit is activated and the pump is prohibited from being driven in the high power mode.

The vehicle brake system of this form has a backup system for handling the failure of the first drive circuit. This form enables construction of the vehicle brake system which is excellent from the viewpoint of failsafe, owing to the third drive circuit.

(5) The vehicle brake system according to any one of the forms (1)-(4), wherein the normal mode is switched to the high power mode when a gradient of increase of the required hydraulic braking force exceeds a set gradient.

(6) The vehicle brake system according to any one of the forms (1)-(5), comprising a brake operation member to be operated by a driver,
wherein the required hydraulic braking force is determined in accordance with a degree of an operation of the brake operation member, and
wherein the normal mode is switched to the high power mode when a rate of increase of the degree of the operation of the brake operation member exceeds a set rate.

In each of the above two forms, a limitation is added to the condition under which the normal mode is switched to the high power mode. Each of the conditions specified in the above two forms is a condition for determining that the pump needs to be driven by the power exceeding the set power when the condition is satisfied. The former form is employable for a vehicle in which the hydraulic braking force is generated not only in accordance with the operation of the brake operation member by a driver, but also in response to a request from a control such as vehicle automated driving. The latter form is deemed to be equivalent to the former form in an instance where the hydraulic braking force is generated in accordance with the operation of the brake operation member such as a brake pedal. The "degree of the operation of the brake operation member" in the latter form may be regarded as a parameter for determining a required hydraulic braking force. For instance, there may be employed, as the degree, an operation amount of the brake operation member (e.g., pedal stroke), an operation force applied to the brake operation member (e.g., pedaling force) or the like. As the rate of increase of the operation amount, there may be employed an operation speed of the brake operation member (e.g., pedal depressing speed). As the rate of increase of the operation force, there may be employed a gradient of increase of the operation force with a lapse of time (e.g., change gradient of the pedaling force). One of the two conditions specified in the respective two forms may be selectively employed or both of the two conditions may be employed. In the vehicle brake system that employs both of the two conditions, the operation mode may be switched from the normal mode to the high power mode when one of the two conditions is satisfied.

(7) The vehicle brake system according to the form (5) or (6), wherein the high power mode is returned to the normal mode when a hydraulic braking force generated by the hydraulic brake device reaches the required hydraulic braking force.

In this form, a limitation is added to the condition under which the high power mode is ended. According to this form, the high power mode is ended when it is no longer necessary to drive the pump by large power, resulting in a reduction in the load on the capacitor.

(8) The vehicle brake system according to any one of the forms (1)-(7), further comprising an electric brake device configured to generate an electric braking force that depends on a force of an electric motor, wherein a hydraulic braking force generated by the hydraulic brake device is given to one of a front wheel and a rear wheel while the electric braking force generated by the electric brake device is given to the other of the front wheel and the rear wheel.

In this form, the electric brake device and the hydraulic brake device are combined. The vehicle brake system according to this form enjoys both of the advantage of good responsiveness offered by the electric brake device and the advantage of high reliability offered by the hydraulic brake device. In this form, when the pump of the hydraulic brake device needs to be driven by large power, the driving of the pump by the motor is assisted by the electric power supplied from the capacitor in the high power mode. It is thus possible to prevent a difference between the responsiveness of the hydraulic brake device and the responsiveness of the electric brake device from becoming large.

(9) The vehicle brake system according to the form (8), wherein the electric power of the battery is supplied also to the electric motor of the electric brake device.

In an instance where the battery, which supplies the electric power to the electric motor of the brake actuator of the hydraulic brake device, supplies the electric power also to the electric motor of the electric brake device, further excessive electric power is inevitably supplied from the battery in sudden braking or the like. Such excessive electric power supplied from the battery to the electric brake device may cause a decrease in the braking force to be generated by the electric brake device depending on situations. In view of this, the assistance by the electric power from the capacitor is effective particularly in this faun.

(10) The vehicle brake system according to the form (8) or (9), further comprising a regenerative brake device provided for one of the front wheel and the rear wheel for which one of the hydraulic brake device and the electric brake device is provided, the regenerative brake device being configured to generate a regenerative braking force utilizing electric power generation by rotation of the one of the front wheel and the rear wheel.

In this from, the regenerative brake device is further combined. The regenerative braking force by the regenerative brake device changes depending upon a state of charge (SOC) of the battery in which regenerative energy is charged as a quantity of electricity. It is thus anticipated that the hydraulic braking force by the hydraulic brake device needs to be rapidly increased with the change in the regenerative braking force, for the purpose of obtaining the braking force required for the vehicle as a whole. In such a case, the assistance by the electric power supplied from the capacitor in the high power mode works effectively.

(11) The vehicle brake system according to any one of the forms (1)-(10), wherein the brake actuator is not equipped with an accumulator on an ejection side of the pump.

In this form, a limitation is added to the structure of the brake actuator. The high-pressure source is often provided with an accumulator for storing a high-pressure working fluid. The provision of the accumulator somewhat reduces the need for driving the pump by large force in sudden braking or the like. Nevertheless, an extra cost is required for the provision of the accumulator, resulting in an increased cost of the hydraulic brake device. Since the brake actuator of this form is not equipped with the accumulator, the cost of the hydraulic brake device per se is low. Thus, this form enables construction of vehicle brake system having good responsiveness while reducing the cost of the system. In other words, the assistance by the electric power supplied from the capacitor in the high power mode is effective particularly in the vehicle brake system including the hydraulic brake device not equipped with the accumulator.

(12) The vehicle brake system according to any one of the forms (1)-(11), wherein the brake actuator includes a control valve configured to decrease a pressure of the working fluid ejected from the pump so as to adjust the pressure in accordance with the required hydraulic braking force.

In many brake actuators, the pressure of the working fluid supplied to the wheel brake is adjusted by a pressure-increase control valve and a pressure-decrease control valve. Specifically, the working fluid ejected from the pump is supplied to the wheel brake via the pressure-increase control valve. To decrease the pressure of the supplied working fluid, the working fluid is permitted to flow from the wheel brake into the low-pressure source via the pressure-decrease control valve. The brake actuator of this form does not have such a configuration. The brake actuator of this form may be configured as follows, for instance. The working fluid is supplied from the pump directly to the wheel brake, and the pressure of the working fluid is decreased by the control valve, whereby the pressure of the working fluid supplied to the wheel brake is adjusted. This configuration enables the hydraulic braking force to be adjusted by only one control valve, resulting in a relatively inexpensive brake actuator.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
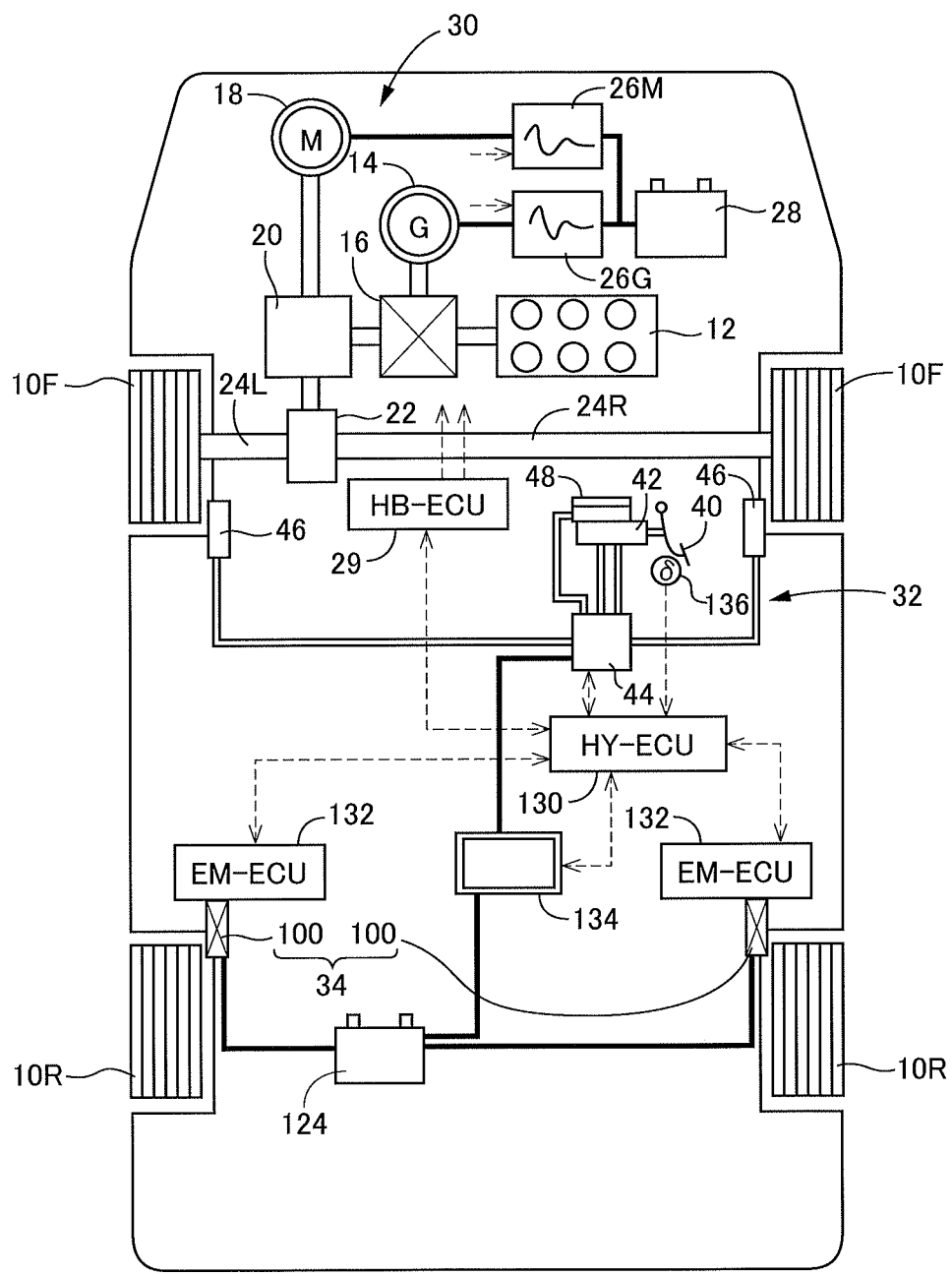
FIG. 1 is a view conceptually showing an overall structure of a vehicle brake system according to one embodiment.

Referring to the drawings, there will be explained a vehicle brake system according to one embodiment of the claimable invention. It is to be understood that the claimable invention is not limited to the details of the following embodiment and the forms described in Forms of the Invention, but may be changed and modified based on the knowledge of those skilled in the art.

[A] Outline of Vehicle Drive System and Vehicle Brake System

As schematically shown in FIG. 1, a vehicle on which a vehicle brake system according to the present embodiment is installed is a hybrid vehicle having two front wheels 10F and two rear wheels 10R, and the two front wheels 10F are drive wheels. The vehicle drive system is first explained. The vehicle drive system installed on the present vehicle includes an engine 12 as a drive source, a generator 14 that mainly functions as an electric generator, a power-distribution mechanism 16 to which the engine 12 and the generator 14 are coupled, and an electric motor 18 as another drive source.

The power-distribution mechanism 16 has a function of distributing rotation of the engine 12 to rotation of the generator 14 and rotation of an output shaft. The electric motor 18 is coupled to the output shaft via a reduction mechanism 20 functioning as a speed reducer. Rotation of the output shaft is transmitted to the front right and left wheels 10F via a differential mechanism 22 and respective drive shafts 24R, 24L, so that the front right and left wheels 10F are drivingly rotated. The generator 14 is coupled to a battery 28 via an inverter 26G Electric energy obtained by electric power generation of the generator 14 is stored in the battery 28. The electric motor 18 is coupled to the battery 28 via an inverter 26M. The electric motor 18 and the generator 14 are controlled by controlling the inverter 26M and the inverter 26G Management of a charged amount of the battery 28 and control of the inverter 26M and the inverter 26G are executed by a hybrid electronic control unit (hereinafter abbreviated as "HB-ECU" as shown in FIG. 1) 29 that includes a computer and drive circuits (drivers) for components of the vehicle drive system. The hybrid electronic control unit 29 will be hereinafter abbreviated as "HB-ECU 29" as shown in FIG. 1.

As schematically shown in FIG. 1, the vehicle brake system of the present embodiment installed on the present vehicle includes (a) a regenerative brake device 30 configured to give a braking force to each of the two front wheels 10F, (b) a hydraulic brake device 32 configured to give a braking force to each of the two front wheels 10F, independently of the braking force given by the regenerative brake device 30, and (c) an electric brake device 34 configured to give a braking force to each of the two rear wheels 10R.

[B] Structure of Regenerative Brake Device

In terms of hardware, the regenerative brake device 30 constitutes a part of the vehicle drive system. When the vehicle decelerates, the electric motor 18 is rotated by rotation of the front wheels 10F without receiving a power supply from the battery 28. The electric motor 18 generates electric power utilizing an electromotive force generated by its rotation, and the generated electric power is stored, via the inverter 26M, in the battery 28 as a quantity of electricity (which may be also referred to as an electric quantity or an electric charge). That is, the electric motor 18 functions as an electric generator, so that the battery 28 is charged. The rotation of the front wheels 10F is decelerated, namely, the vehicle is decelerated, by an amount corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the amount of the generated electric power, and the generated regenerative braking force is controlled by the control of the inverter 26M executed by the HB-ECU 29. A detailed explanation of the regenerative brake device 30 is dispensed with because any regenerative brake device having a known ordinary structure can be employed as the regenerative brake device 30.

[C] Structure of Hydraulic Brake Device i) Overall Structure

The hydraulic brake device 32 includes (a) a master cylinder 42 to which is connected a brake pedal 40, as a brake operation member, to be operated by a driver, (b) an actuator unit 44 configured to allow the working fluid from the master cylinder 42 to pass therethrough so as to supply the working fluid or configured to adjust the pressure of the working fluid pressurized by its pump (that will be explained) so as to supply the working fluid, and (c) two wheel brakes 46 respectively provided for the right and left front wheels 10F and configured to decelerate rotation of the respective right and left front wheels 10F by the pressure of the working fluid supplied from the actuator unit 44. The hydraulic brake device 32 is a two-system or tandem device corresponding to the right and left front wheels 10F.

ii) Structure of Master Cylinder

Figure 2:
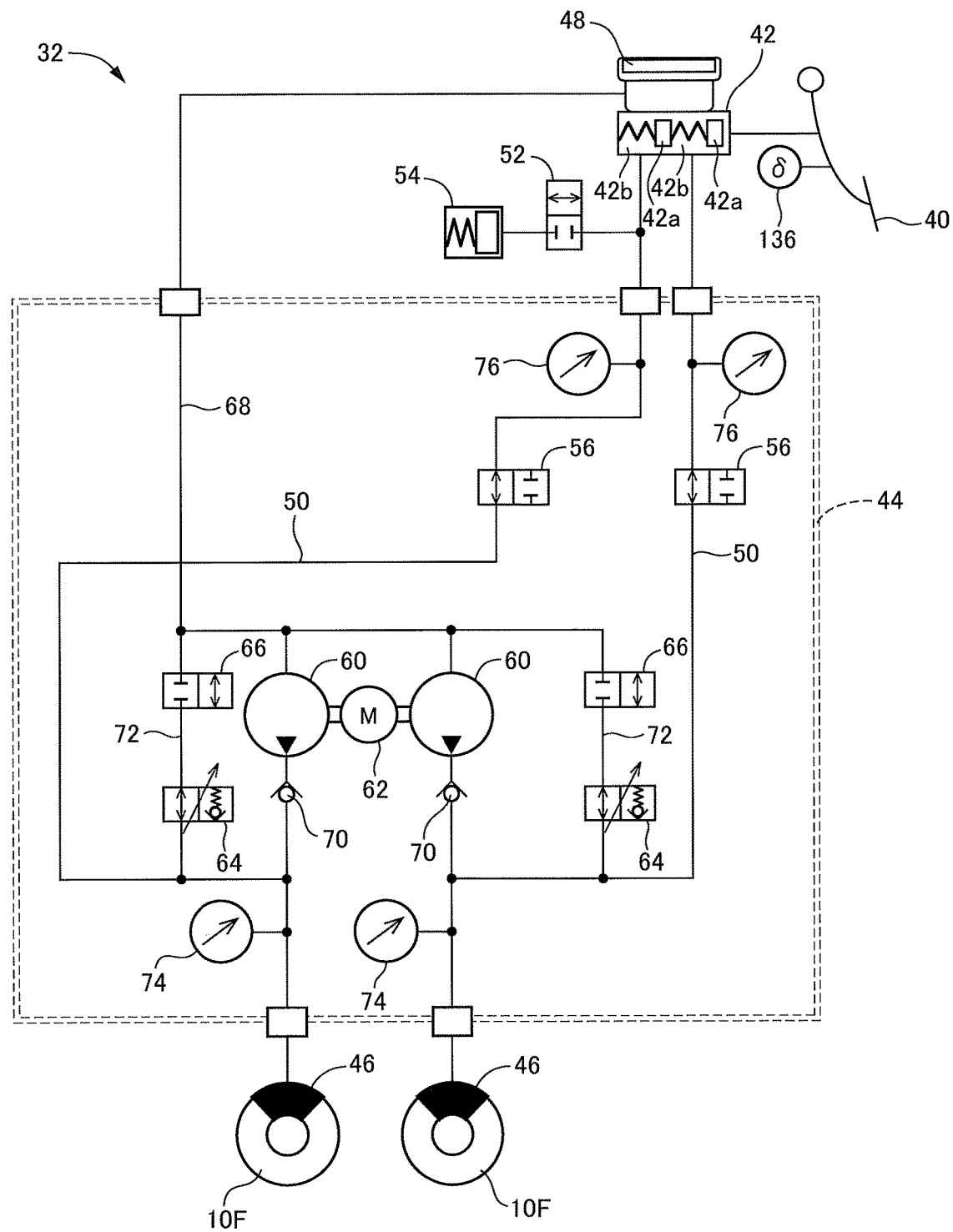
FIG. 2 is a hydraulic circuit diagram of a hydraulic brake device of the vehicle brake system shown in FIG. 1.

As shown in FIG. 2, the master cylinder 42 is a tandem cylinder device including, in a housing, two pistons 42a arranged in series and connected to the brake pedal 40 and two pressurizing chambers 42b in each of which the working fluid that has introduced thereinto is pressurized by a movement of a corresponding one of the pistons 42a. A reservoir 48 that stores the working fluid at the atmospheric pressure is disposed near the master cylinder 42. The working fluid from the reservoir 48 is pressurized in each of the two pressurizing chambers 42b. The master cylinder 42 is configured to supply, to the actuator unit 44, the working fluid whose pressure corresponds to a force applied to the brake pedal 40 (hereinafter referred to as "brake operation force" where appropriate), for the respective two systems that correspond to the respective two front wheels 10F. Specifically, the actuator unit 44 has fluid passages through which the working fluid supplied from the master cylinder 42 flows toward the respective wheel brakes 46. That is, the hydraulic brake device 32 has two fluid passages through which the working fluid is supplied from the master cylinder 42 to the respective wheel brakes 46, i.e., two master fluid passages 50. In the hydraulic brake device 32, the working fluid can be supplied from the master cylinder 42 to the wheel brakes 46 via the respective master fluid passages 50. Each of the wheel brakes 46 has a wheel cylinder (that will be explained), and the working fluid is supplied to the wheel cylinder.

To one of the two master fluid passages 50, a stroke simulator 54 is connected via a simulator opening valve 52 which is a normally-closed electromagnetic open/close valve. In a normal operating condition in which no electric failure is occurring, the simulator opening valve 52 is energized into a valve open state, so that the stroke simulator 54 operates. In the normal operating condition, two master-cut valves 56, which are the electromagnetic open/close valves and which are provided in the actuator unit 44 so as to correspond to the two systems, are placed in a valve closed state, so that the stroke simulator 54 permits a depression stroke of the brake pedal 40 and gives, to the brake pedal 40, an operation counterforce in accordance with the depression stroke. That is, the stroke simulator 54 has a function of enhancing a feeling of the brake operation as felt by the driver in the normal operating condition. The stroke simulator 54 of the present embodiment has a known structure. For instance, the stroke simulator 54 includes: a fluid chamber which communicates with the master fluid passage 50 and whose volume is variable; and an elastic body configured to apply, to the working fluid in the fluid chamber, a force in accordance with an amount of volume increase of the fluid chamber. Thus, the stroke simulator 54 is not explained in detail here.

iii) Structure of Actuator Unit

The actuator unit 44 as a brake actuator includes: the two master-cut valves 56, each as a normally-opened electromagnetic open/close valve, configured to open and close the respective two master fluid passages 50; two pumps 60 that correspond to the two systems; a pump motor 62, as an electric motor, for driving the pumps 60; two control valves 64, each as an electromagnetic linear valve, corresponding to the two systems; and two cut-off valves 66, each as a normally-closed electromagnetic open/close valve, disposed in series with the respective control valves 64. In the hydraulic brake device 32, only one reservoir is provided, and the two pumps 60 are configured to pump up the working fluid from the reservoir 48. To this end, there is formed a reservoir fluid passage 68 that connects the two pumps 60 and the reservoir 48, and a part of the reservoir fluid passage 68 is located in the actuator unit 44. Each of the pumps 60 is connected to the corresponding master fluid passage 50 on its ejection side and supplies, to a corresponding wheel brake 46, the pressurized working fluid via a part of the master fluid passage 50. On the ejection side of each pump 60, a check valve 70 is provided for preventing a backflow of the working fluid to the pump 60. In the actuator unit 44, there are formed two return passages 72 each of which is disposed in parallel with the corresponding pump 60 for connecting the corresponding master fluid passage 50 and the reservoir fluid passage 68 to each other. The control valve 64 and the cut-off valve 66 are provided on each of the two return passages 72. The pump motor 62 will be later explained. In the actuator unit 44 of the present embodiment, an accumulator for storing a high-pressure working fluid is not provided on the ejection side of each pump 60. Thus, a high-pressure source is constituted only by the pumps 60, and the actuator unit 44 is simple in structure.

In the normal operating condition, the master-cut valves 56 are in the valve closed state while the cut-off valves 66 are in the valve open state. When the pumps 60 are driven by the pump motor 62, the working fluid in the reservoir 48 is pressurized and the pressurized working fluid is supplied to the wheel brakes 46. Each control valve 64 has a function of adjusting the pressure of the working fluid to be supplied to the corresponding wheel brake 46 to a pressure in accordance with an electric current supplied to the control valve 64. In other words, each control valve 64 is constituted as a pressure-decrease electromagnetic linear valve having a function of decreasing the pressure of the working fluid to be supplied to the wheel brake 46. In the hydraulic brake device 32, the working fluid whose pressure is adjusted by controlling the control valves 64 is supplied to the wheel brakes 46 without depending on the pressure of the working fluid supplied from the master cylinder 42, namely, without depending on the brake operation force applied to the brake pedal 40. The control valve 64 is a pressure-decrease valve, and the working fluid passes through the control valve 64 for pressure adjustment. The working fluid that has passed through each control valve 64 returns to the reservoir fluid passage 68 and accordingly to the reservoir 48 via the corresponding return passage 72 and the corresponding cut-off valve 66 in the valve open state.

In an instance where the hydraulic brake device 32 is suffering from an electric failure, the master-cut valves 56 are placed in the valve open state while the cut-off valves 66 are placed in the valve closed state, so that the working fluid supplied from the master cylinder 42 to the actuator unit 44 is supplied to the wheel brakes 46. In other words, when the wheel cylinders (which will be explained) are operated by the working fluid supplied from the master cylinder 42 in a state in which the master-cut valves 56, each as the open/close valve, are opened, each cut-off valve 66 cuts a flow of the working fluid into the reservoir 48 or the reservoir fluid passage 68. Two wheel cylinder pressure sensors 74 and two master pressure sensors 76 are provided in the actuator unit 44 so as to correspond to the two systems. Each wheel cylinder pressure sensor 74 is configured to detect the pressure of the working fluid to be supplied to the corresponding wheel brake 46 (hereinafter referred to as "wheel cylinder pressure" where appropriate). Each master pressure sensor 76 is configured to detect the pressure of the working fluid supplied from the master cylinder 42 (hereinafter referred to as "master pressure" where appropriate).

iv) Structure of Wheel Brake

Figure 3A:
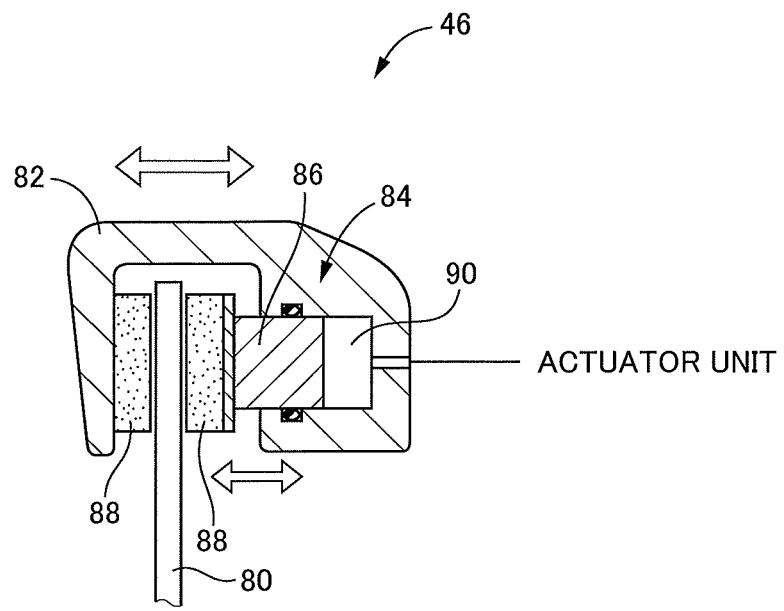
FIG. 3A is a cross-sectional view of a wheel brake of the hydraulic brake device of the vehicle brake system shown in FIG. 1.

Each wheel brake 46 for stopping rotation of the corresponding front wheel 10F is a disc brake device schematically shown in FIG. 3A. Each wheel brake 46 includes a disc rotor 80, as a rotation body, configured to rotate together with the corresponding front wheel 10F and a caliper 82 movably supported by a carrier that rotatably holds the front wheel 10F. The caliper 82 incorporates a wheel cylinder 84 whose housing is defined by a part of the caliper 82. A pair of brake pads 88, each as a friction member, are provided such that one brake pad 88 is attached to and held by a distal end of a piston 86 of the wheel cylinder 84 and the other brake pad 88 is attached to and held by a portion of the caliper 82 located opposite to a portion thereof in which the wheel cylinder 84 is incorporated. Thus, the two brake pads 88 are opposed to each other with the disc rotor 80 interposed therebetween.

The working fluid is supplied from the actuator unit 44 to a fluid chamber 90 of the wheel cylinder 84, and the pressure of the working fluid causes the brake pads 88 to nip the disc rotor 80 therebetween. That is, the wheel cylinder 84 is operated to cause the brake pads 88 to be pushed onto the disc rotor 80. Thus, each wheel brake 46 generates, utilizing a friction force, a braking force to stop rotation of the corresponding front wheel 10F, i.e., a braking force to brake the vehicle (hereinafter referred to as "hydraulic braking force" where appropriate). The hydraulic braking force has a magnitude in accordance with the pressure of the working fluid supplied from the actuator unit 44. The wheel brakes 46 have a known ordinary structure, and a detailed explanation thereof is dispensed with.

[D] Structure of Electric Brake Device

Figure 3B:
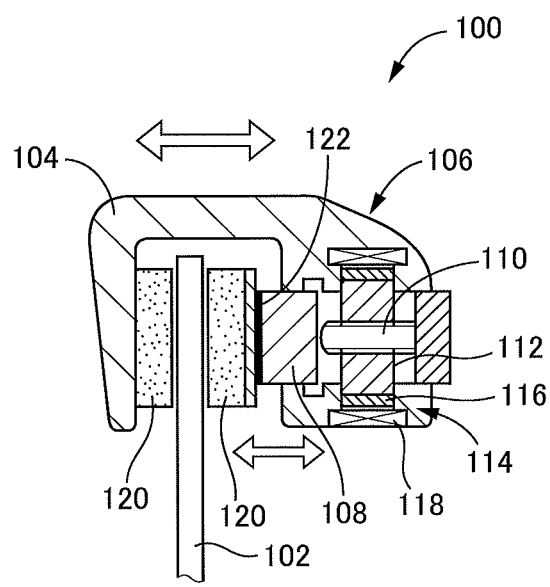
FIG. 3B is a cross-sectional view of a wheel brake of an electric brake device of the vehicle brake system shown in FIG. 1.

As shown in FIG. 1, the electric brake device 34 includes a pair of wheel brakes 100 for stopping rotation of the corresponding rear wheels 10R. As shown in FIG. 3B, each wheel brake 100 is similar in structure to the wheel brakes 46 of the hydraulic brake device 32. Each wheel brake 46 operates by the pressure of the working fluid whereas each wheel brake 100 operates by a force of an electric motor.

Each wheel brake 100 includes a disc rotor 102, as a rotation body, configured to rotate together with the corresponding rear wheel 10R and a caliper 104 movably supported by a carrier that rotatably holds the corresponding rear wheel 10R. The caliper 104 incorporates an electric actuator 106. The electric actuator 106 includes (a) a plunger 108 held by the caliper 104 so as to be advanceable and retractable, (b) a threaded rod 110 which is held by the caliper 104 so as to be unrotatable and so as to be advanceable and retractable relative to the disc rotor 102 and which has an external thread formed on its outer circumference, (c) a nut 112 which has an internal thread that is held in engagement with the external thread of the threaded rod 110 and which is held by the caliper 104 so as to be rotatable and so as not to be advanceable and retractable relative to the disc rotor 102, and (d) an electric motor 114 configured to rotate the nut 112. The electric motor 114 includes: magnets 116 attached to an outer circumference of the nut 112; and coils 118 held by the caliper 104.

A pair of brake pads 120, each as a friction member, are provided such that one brake pad 120 is attached to and held by a distal end of the plunger 108 of the electric actuator 106 and the other brake pad 120 is attached to and held by a portion of the caliper 104 located opposite to a portion thereof in which the electric actuator 106 is disposed. Thus, the two brake pads 120 are opposed to each other with the disc rotor 102 interposed therebetween. The electric actuator 106 is configured such that the brake pads 120 are pushed onto the disc rotor 102 by rotation of the electric motor 114 as a drive source. In other words, the electric actuator 106 includes a mechanism constituted by the plunger 108, the threaded rod 110, and the nut 112, namely, a motion converting mechanism for moving the friction members by the force of the electric motor 114. That is, each wheel brake 100 of the electric brake device 34 controls a force to be generated by the electric motor 114 and applies the force as a force for stopping or decelerating the rotation of the wheel, via the motion converting mechanism.

Thus, each wheel brake 100 of the electric brake device 34 generates, utilizing a friction force, a braking force to stop rotation of the corresponding rear wheel 10R, namely, a braking force to brake the vehicle (hereinafter referred to as "electric braking force" where appropriate). The electric braking force depends on a pushing force by which the brake pad 120 is pushed by the plunger 108. Each wheel brake 100 has a pushing force sensor 122, as a load cell, provided between the plunger 108 and the brake pad 120 for detecting the pushing force. The wheel brakes 100 have a known ordinary structure, and a detailed explanation thereof is dispensed with. As shown in FIG. 1, an electric current is supplied to the electric motor 114 of each wheel brake 100 from an auxiliary battery 124 different from the battery 28.

[E] Control of Vehicle Brake System
i) Control System

Control of the vehicle brake system, namely, control of a braking force F, is executed by a control system shown in FIG. 1. (Respective braking forces are collectively referred to as "braking force F" where appropriate.) Specifically, the hydraulic brake device 32 is controlled by an electronic control unit for the hydraulic brake device (hereinafter abbreviated as "HY-ECU") 130. The electric brake device 34 is controlled by two electronic control units for the electric brake device (hereinafter referred to as "EM-ECU") 132 provided for the respective wheel brakes 100. As explained above, the regenerative brake device 30 is controlled by the HB-ECU 29.

The pump motor 62 of the actuator unit 44 of the hydraulic brake device 32 is operated by the electric power supplied from the auxiliary battery 124. There is provided, between the auxiliary battery 124 and the actuator unit 44, a supply power control unit 134 for controlling the electric power to be supplied to the pump motor 62. The supply power control unit 134 will be later explained in detail. The HY-ECU 130 controls the supply power control unit 134 as well as the actuator unit 44. The HY-ECU 130 includes a computer as a main constituent element and drivers (drive circuits) for components of the actuator unit 44 such as the control valves 64. Similarly, each of the EM-ECUs 132 includes a computer as a main constituent element. As later explained, a driver (a drive circuit) for the electric motor 114 of each wheel brake 100 of the electric brake device 34 is provided in the wheel brake 100.

Specifically, the HB-ECU 29 controls the inverters 26G, 26M that constitute the regenerative brake device 30, the HY-ECU 130 controls the supply power control unit 134 and the control valves 64 etc., of the actuator unit 44 that constitutes the hydraulic brake device 32, and the EM-ECUs 132 control the electric motors 114 of the wheel brakes 100 that constitute the electric brake device 34, thereby controlling the regenerative braking force $F_{RG}$, the hydraulic braking force $F_{HY}$, and the electric braking force $F_{EM}$. Consequently, an overall braking force $F_{SUM}$, which is the braking force F to be given to the vehicle as a whole, is controlled. In the vehicle brake system, the HB-ECU 29, the HY-ECU 130, and the EM-ECUs 132 are connected to one another by a network in the vehicle (CAN) and execute the respective controls while performing communication with one another. As later explained, the HY-ECU 130 functions, in the present vehicle brake system, as a main electronic control unit that also controls the HB-ECU 29 and the EM-ECUs 132.

ii) Basic Control of Braking Force

Figure 4:
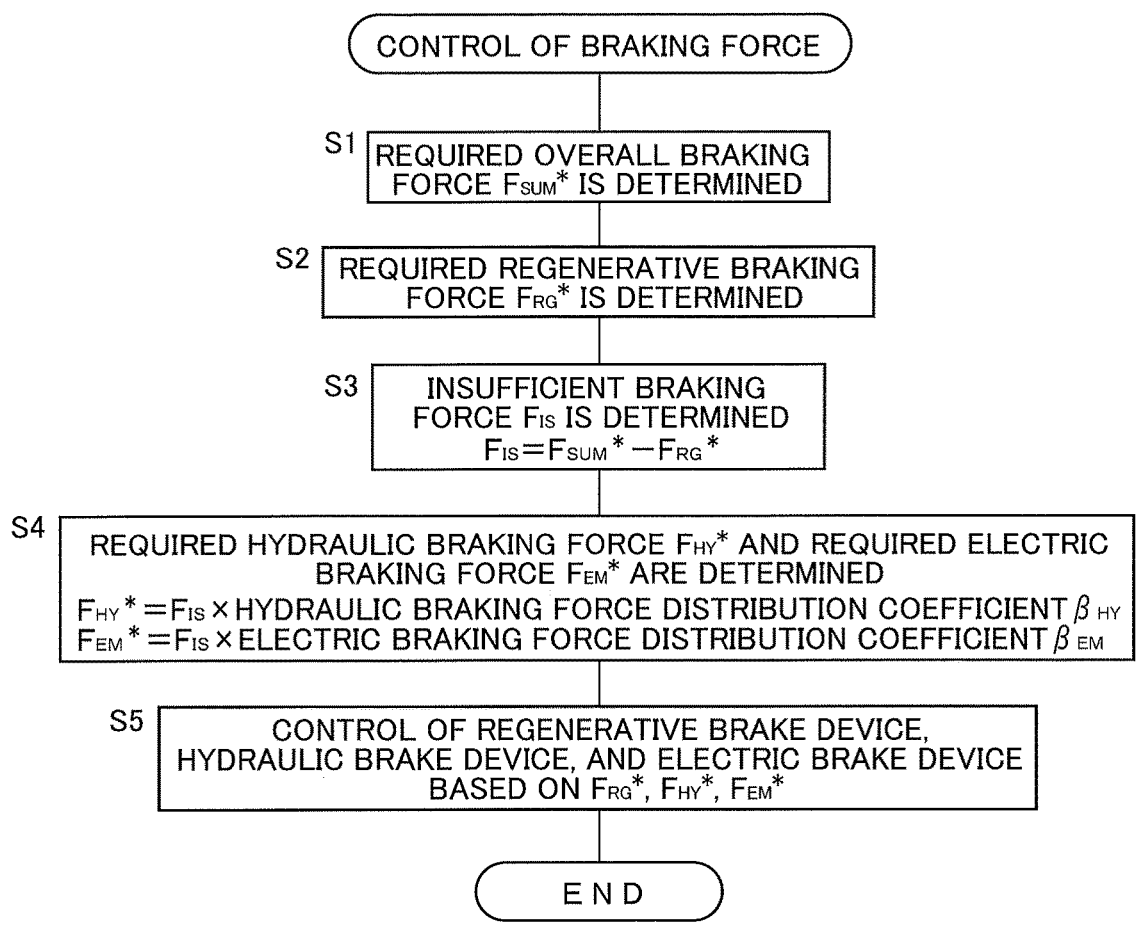
FIG. 4 is a flowchart conceptually showing a control of a braking force in the vehicle brake system shown in FIG. 1.

Basic control of the braking force in the present vehicle brake system is executed as conceptually shown in a flowchart of FIG. 4. The basic control of the braking force will be hereinafter explained based on the flowchart. Processing based on the flowchart is repeatedly executed at a short time pitch, e.g., about several milliseconds (msec).

There is initially determined, at Step 1, a required overall braking force $F_{SUM}$* which is a braking force F required for the vehicle as a whole, i.e., a sum of the braking forces F to be given to the four wheels 10, based on an operation of the brake pedal 40 as the brake operation member. (Hereinafter, Step 1 is abbreviated as "S1" and other steps are similarly abbreviated.) Specifically, the brake pedal 40 is provided with an operation stroke sensor 136 for detecting an operation stroke δ as an operation amount of the brake pedal 40, as shown in FIGS. 1 and 2. The HY-ECU 130 obtains the required overall braking force $F_{SUM}$* by multiplying the operation stroke δ detected by the operation stroke sensor 136 by a braking force coefficient $α_F$. The operation stroke δ is one example of an operation value indicative of a degree of the operation of the brake pedal 40, namely, indicative of a degree of the brake operation, and may be considered as a parameter indicative of the required overall braking force $F_{SUM}$*.

In the present brake system, the regenerative braking force $F_{RG}$ is preferentially generated, and the hydraulic braking force $F_{HY}$ and the electric braking force $F_{EM}$ cover a shortage in the required overall braking force $F_{SUM}$* that cannot be covered by the regenerative braking force $F_{RG}$. The shortage will be referred to as "insufficient braking force $F_{Is}$". The regenerative braking force $F_{RG}$, the hydraulic braking force $F_{HY}$, and the electric braking force $F_{EM}$ correspond to a sum of the braking forces F to be given to two wheels 10, i.e., two front wheels 10F or two rear wheels 10R, respectively by the regenerative brake device 30, the hydraulic brake device 32, and the electric brake device 34. Actually, there are given, to each of the two front wheels 10F or each of the two rear wheels 10R, a half of the regenerative braking force $F_{RG}$, a half of the hydraulic braking force $F_{HY}$, and a half of the electric braking force $F_{EM}$. For the sake of brevity, the two front wheels 10F are regarded as a virtual one front wheel 10F, and the two rear wheels 10R are regarded as a virtual one rear wheel 10R, and the following explanation will be made on the understanding that the regenerative braking force $F_{RG}$, the hydraulic braking force $F_{HY}$, and the electric braking force $F_{EM}$ are given to the one front wheel 10F or the one rear wheel 10R.

To attain the above, a signal relating to the required overall braking force $F_{SUM}^*$ is transmitted from the HY-ECU 130 to the HB-ECU 29. At S2, the HB-ECU 29 determines a required regenerative braking force $F_{RG}^*$ as a maximum regenerative braking force $F_{RG}$ that can be generated within a range not exceeding the required overall braking force $F_{SUM}^*$. A signal relating to the required regenerative braking force $F_{RG}^*$ is returned from the HB-ECU 29 to the HY-ECU 130.

At S3, the HY-ECU 130 determines the insufficient braking force $F_{IS}$ by subtracting the required regenerative braking force $F_{RG}^*$ from the required overall braking force $F_{SUM}^*$. The insufficient braking force $F_{IS}$ is covered by the hydraulic braking force $F_{HY}$ and the electric braking force $F_{EM}$ such that the hydraulic braking force $F_{HY}$ and the electric braking force $F_{EM}$ satisfy a set distribution ratio $(\beta_{HY}:\beta_{EM})$. Specifically, at S4, the HY-ECU 130 respectively multiplies the insufficient braking force $F_{IS}$ by a hydraulic braking force distribution coefficient $\beta_{HY}$ and an electric braking force distribution coefficient $\beta_{EM}$ ($\beta_{HY}+\beta_{EM}=1$), so as to determine a required hydraulic braking force $F_{HY}^*$ as the hydraulic braking force $F_{HY}$ to be generated and a required electric braking force $F_{EM}^*$ as the electric braking force $F_{EM}$ to be generated. A signal relating to the required electric braking force $F_{EM}^*$ is transmitted from the HY-ECU 130 to the EM-ECUs 132.

At S5, the regenerative brake device 30, the hydraulic brake device 32, and the electric brake device 34 are controlled respectively based on the required regenerative braking force $F_{RG}^*$, the required hydraulic braking force $F_{HY}^*$, and the required electric braking force $F_{EM}^*$ determined as described above. Specifically, the HB-ECU 29 controls the inverter 26M such that the regenerative braking force $F_{RG}$ becomes equal to the required regenerative braking force $F_{RG}^*$. The HY-ECU 130 controls the electric current to be supplied to the control valves 64 such that the hydraulic braking force $F_{HY}$ becomes equal to the required hydraulic braking force $F_{HY}^*$. The EM-ECUs 132 control the electric current to be supplied to the electric motors 114 such that the electric braking force $F_{EM}$ becomes equal to the required electric braking force $F_{EM}^*$. As apparent from the structure of the actuator unit 44 that constitutes the hydraulic brake device 32, an accumulator is not provided on the ejection side of each pump 60 as the high-pressure source. Accordingly, the HY-ECU 130 is configured to issue a command to the supply power control unit 134 such that the pump motor 62 starts operating at a time point of initiation of the operation of the brake pedal 40 (operation stroke $\delta$>0).

According to the control described above, the regenerative braking force, the hydraulic braking force, and the electric braking force are controlled so as to cooperate with one another. Specifically, the regenerative braking force, the hydraulic braking force, and the electric braking force are cooperatively controlled such that the hydraulic braking force and the electric braking force cover the shortage in the required overall braking force that cannot be covered by the regenerative braking force, i.e., the insufficient braking force. The cooperative control enables an appropriate required overall braking force to be easily obtained even if the regenerative braking force varies due to a variation in the vehicle running speed or a variation in the state of charge (SOC) of the battery 28, for instance. Further, the hydraulic braking force and the electric braking force are cooperatively controlled such that the hydraulic braking force and the electric braking force are generated at the set distribution ratio $(\beta_{HY}:\beta_{EM})$. The cooperative control enables the two braking forces to be controlled according to a simple control rule, whereby an appropriate braking force required for the vehicle as a whole can be easily controlled.

In an instance where the vehicle is equipped with an automatic brake (i.e., a brake that does not depend on the operation of the brake pedal 40), the overall braking force $F_{SUM}$ required in processing for the automatic brake may be determined at S1 as the required overall braking force $F_{SUM}^*$. Further, the hydraulic braking force $F_{HY}$ and the electric braking force $F_{EM}$ required in the processing for the automatic brake may be respectively utilized as the required hydraulic braking force $F_{HY}^*$ and the required electric braking force $F_{EM}^*$, and the process at S5 may be executed based on the required hydraulic braking force $F_{HY}^*$ and the required electric braking force $F_{EM}^*$.

[F] Supply of Electric Power to Pump Motor i) Need for Handling Sudden Braking

Figure 5:
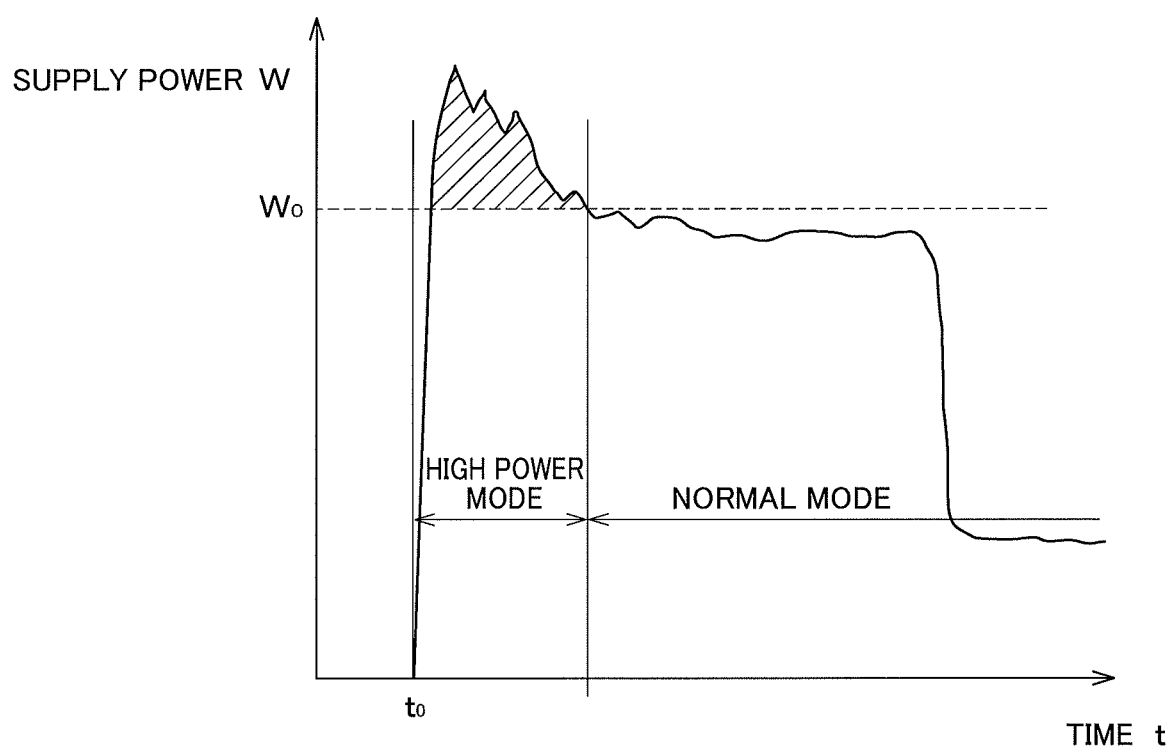
FIG. 5 is a graph schematically showing an electric power supplied from a battery to a pump motor of the hydraulic brake device in sudden braking.
Figure 6:
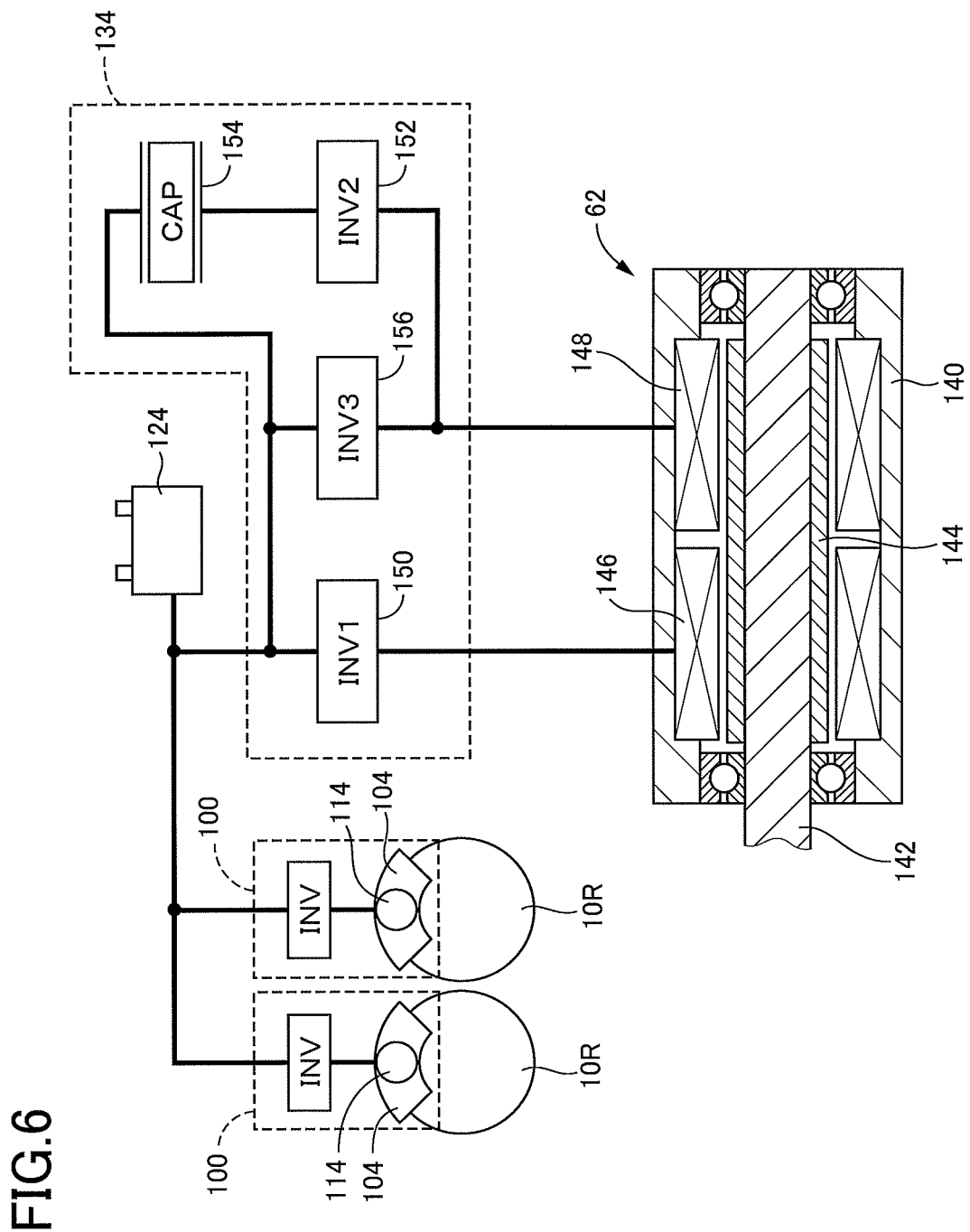
FIG. 6 is a view conceptually showing the pump motor of the hydraulic brake device shown in FIG. 1 and a supply power control unit for supplying the electric power to the pump motor.

As explained above, the pumps 60 of the actuator unit 44 need to be driven to generate the hydraulic braking force $F_{HY}$, and the pump motor 62 is operated to drive the pumps 60. Especially in sudden braking or the like, a quick response of the hydraulic braking force $F_{HY}$ is required, and the pumps 60 have to be driven by large power. In this instance, it is required to supply electric power W shown in FIG. 5 to the pump motor 62, for example. (The electric power W to be supplied to the pump motor 62 will be hereinafter referred to as "supply power W" where appropriate.) Specifically, the supply power W to be required changes with a lapse of time t of the operation of the brake pedal 40. As shown in FIG. 5, large supply power W is required in an early time period starting from a time point ($t_0$) of initiation of the brake operation. The electric power is supplied from the auxiliary battery 124 to the pump motor 62. Excessive supply power indicated by a hatched area in FIG. 5 not only renders the auxiliary battery 124 unstable, but also adversely influences generation of the electric braking force $F_{EM}$ and operating conditions of other devices since the auxiliary battery 124 supplies the electric power to the electric motors 114 of the wheel brakes 100 in the electric brake device 34 and other devices (FIG. 6). Specifically, excessive supply power from the auxiliary battery 124 to the pump motor 62 in sudden braking may cause a risk of a decrease in the electric braking force $F_{EM}$ to be generated. Conversely, large electric power needs to be supplied also to the electric motors 114 of the wheel brakes 100 in sudden braking, resulting in an increased load on the auxiliary battery 124. In view of this, the present vehicle brake system employs measures explained below as to the supply of the electric power to the pump motor 62.

ii) Basic Structure of Pump Motor and Supply Power Control Unit

As schematically shown in FIG. 6, the pump motor 62 in the present vehicle brake system is a two-system motor. Specifically, the pump motor 62 includes: a housing 140; a motor shaft (rotation output shaft) 142 rotatably held by the housing 140; magnets 144, each as a rotor, attached to the outer circumference of the motor shaft 142; and a first coil 146 and a second coil 148, each as a stator, fixed to the housing 140 so as to be opposed to the respective magnets 144. The motor shaft 142 can be rotated by supplying an electric current to only one of the first coil 146 and the second coil 148. Further, the motor shaft 142 can be rotated by a larger force, namely, at a higher rotational speed when an electric current is supplied to both of the first coil 146 and the second coil 148 than when an electric current is supplied to only one of the first coil 146 and the second coil 148.

The supply power control unit 134 includes: a first inverter 150 and a second inverter 152 each as a drive circuit; and a capacitor 154. The first inverter 150 as a first drive circuit corresponds to the first coil 146 of the pump motor 62 while the second inverter 152 as a second drive circuit corresponds to the second coil 148 of the pump motor 62. The first inverter 150 is connected directly to the auxiliary battery 124 while the second inverter 152 is connected to the auxiliary battery 124 via the capacitor 154. The capacitor 154 includes a storage body and a control circuit. The capacitor 154 is configured to selectively perform charging of the storage body by an electric current from the auxiliary battery 124 and discharging from the storage body to the second inverter 152.

Since the pump motor 62 is operated by AC electricity, the pump motor 62 is an AC motor in a strict sense. The pump motor 62, however, may be regarded as a two-system DC brushless motor that depends on functions of the first inverter 150 and the second inverter 152.

iii) Drive Modes of Pump and Switching of Drive Modes

In the vehicle brake system, the drive mode of each pump 60 is set to a normal mode in an instance where the pumps 60 need to be driven by power not greater than set power, namely, where it is merely required to supply relatively small electric power to the pump motor 62. On the other hand, the drive mode of each pump 60 is set to a high power mode in an instance where the pumps 60 need to be driven by power exceeding the set power, namely, where relatively large electric power has to be supplied to the pump motor 62. The set power is set as power in a case in which a threshold electric power $W_0$ in FIG. 5 is supplied to the pump motor 62, in other words, the set power is set as power in a case in which there is supplied, from the auxiliary battery 124, an electric current in an amount which does not render the state of the auxiliary battery 124 unstable and which does not give an adverse influence on other devices, such as a decrease in the electric braking force to be generated by the electric brake device 34. In the situation shown in FIG. 5, the drive mode of the pumps 60 is set to the high power mode in an initial period of the brake operation.

In the normal mode, the electric power is supplied to the first coil 146 of the pump motor 62 from the auxiliary battery 124 via the first inverter 150. In the high power mode, the electric power is supplied from the auxiliary battery 124 to the first coil 146 of the pump motor 62 via the first inverter 150, and the electric power is supplied from the capacitor 154 to the second coil 148 of the pump motor 62 via the second inverter 152.

In the high power mode, the supply of the electric power from the auxiliary battery 124 is restricted. In other words, an upper limit is set for the electric power supplied from the auxiliary battery 124 to the pump motor 62. Specifically, the supply power W beyond the threshold electric power $W_0$ is inhibited from being supplied, and a part of the supply power W corresponding to an amount that exceeds the threshold electric power $W_0$ is supplied from the capacitor 154. That is, among the power for driving the pumps 60, the amount that exceeds the set power is covered by the electric power supplied from the capacitor 154 to the second coil 148.

Whether the pumps 60 are to be driven in the normal mode or the high power mode, namely, whether or not sudden braking is requested, may be basically determined depending on whether a gradient of increase $R_{FHY}$ of the required hydraulic braking force $F_{HY}^*$, i.e., increase gradient $R_{FHY}$, has exceeded a set gradient $R_{FHY0}$. In view of the required hydraulic braking force $F_{HY}^*$ determined as described above, the increase gradient $R_{FHY}$ depends on a stroke speed $R\delta$ which is a speed of increase in the operation stroke $\delta$ in an instance where the regenerative braking force $F_{RG}$ and the automatic brake are not taken into consideration. It is accordingly determined that sudden braking is being conducted if the stroke speed $R\delta$ is high. Thus, for enabling a quick response, the drive mode of the pumps 60 is determined based on the stroke speed $R\delta$ which is a speed of increase in the degree of the operation of the brake pedal 40, irrespective of the hydraulic braking force $F_{HY}$. Specifically, when the stroke speed $R\delta$ exceeds a set speed $R\delta_0$, the drive mode is switched from the normal mode to the high power mode. In consideration of a case in which the regenerative braking force $F_{RG}$ is abruptly decreased or in consideration of the automatic brake (that does not depend on the operation of the brake pedal 40), the drive mode is switched from the normal mode to the high power mode also when the increase gradient $R_{FHY}$ of the required hydraulic braking force has exceeded the set gradient $R_{FHY0}$, irrespective of the operation stroke $\delta$.

As shown in FIG. 5, the pumps 60 need not be driven by large power after the initial period of the brake operation. That is, it is merely required to supply relatively small electric power to the pump motor 62, and the drive mode of the pumps 60 is accordingly set to the normal mode. In the high power mode, the electric power is supplied also from the capacitor 154. In consideration of a decrease in the power storage amount of the capacitor 154, it is preferable that the pumps 60 be driven in the high power mode for a time period as short as possible. Thus, in the present vehicle brake system, when the hydraulic braking force $F_{HY}$ that is being actually generated reaches the required hydraulic braking force $F_{HY}^*$, the drive mode is switched from the high power mode back to the normal mode.

iv) Handling of Failure

The present vehicle brake system also employs measures to handle a failure. As shown in FIG. 6, the supply power control unit 134 includes a third inverter 156, as a third drive circuit, which is disposed in parallel with the first inverter 150 and the second inverter 152. The third inverter 156 is configured to supply the electric power from the auxiliary battery 124 to the second coil 148 of the pump motor 62. In the event of failure of the first inverter 150, the drive mode of the pumps 60 is set to an inverter failure mode in which the third inverter 156 is activated and the pump motor 62 is operated by the electric power from the auxiliary battery 124, whereby the pumps 60 are driven. In this case, for permitting an electric current to be supplied to the second coil 148 also from the capacitor 154, the second inverter 152 needs to perform an adjustment of the electric current so as to conform the phase of the electric current to the phase of an electric current supplied from the auxiliary battery 124 to the second coil 148. To obviate such complicated adjustment, in the inverter failure mode, the electric power is prohibited from being supplied from the capacitor 154 via the second inverter 152. That is, when the first inverter 150 is in failure, the pumps 60 are prohibited from being driven in the high power mode.

In the event of failure of the auxiliary battery 124, namely, in an instance where the supply of the electric power from the auxiliary battery 124 is cut off, the drive mode of the pumps 60 is set to a battery failure mode in which the electric power is supplied to the pump motor 62 via the second inverter 152 based on the electric charge in the capacitor 154. That is, the pumps 60 are driven only by the electric power from the capacitor 154. In this sense, the second inverter 152 and the capacitor 154 have a function of handling the failure, in addition to the function of assisting the driving of the pumps 60 in the high power mode. When the drive mode of the pumps 60 is in the battery failure mode, the electric braking force $F_{EM}$ is not generated by the wheel brakes 100 of the electric brake device 34 provided for the rear wheels 10R. In this instance, however, it is possible to obtain the overall braking force $F_{SUM}$ which is sufficient to a certain degree by the hydraulic braking force $F_{HY}$ generated by the electric power supplied from the capacitor 154.

When the second inverter 152 is in failure, the drive mode is prohibited from being switched to the high power mode, and the pumps 60 are kept driven in the normal mode.

v) Control Flow for Switching of Drive Modes of Pump

Figure 7:
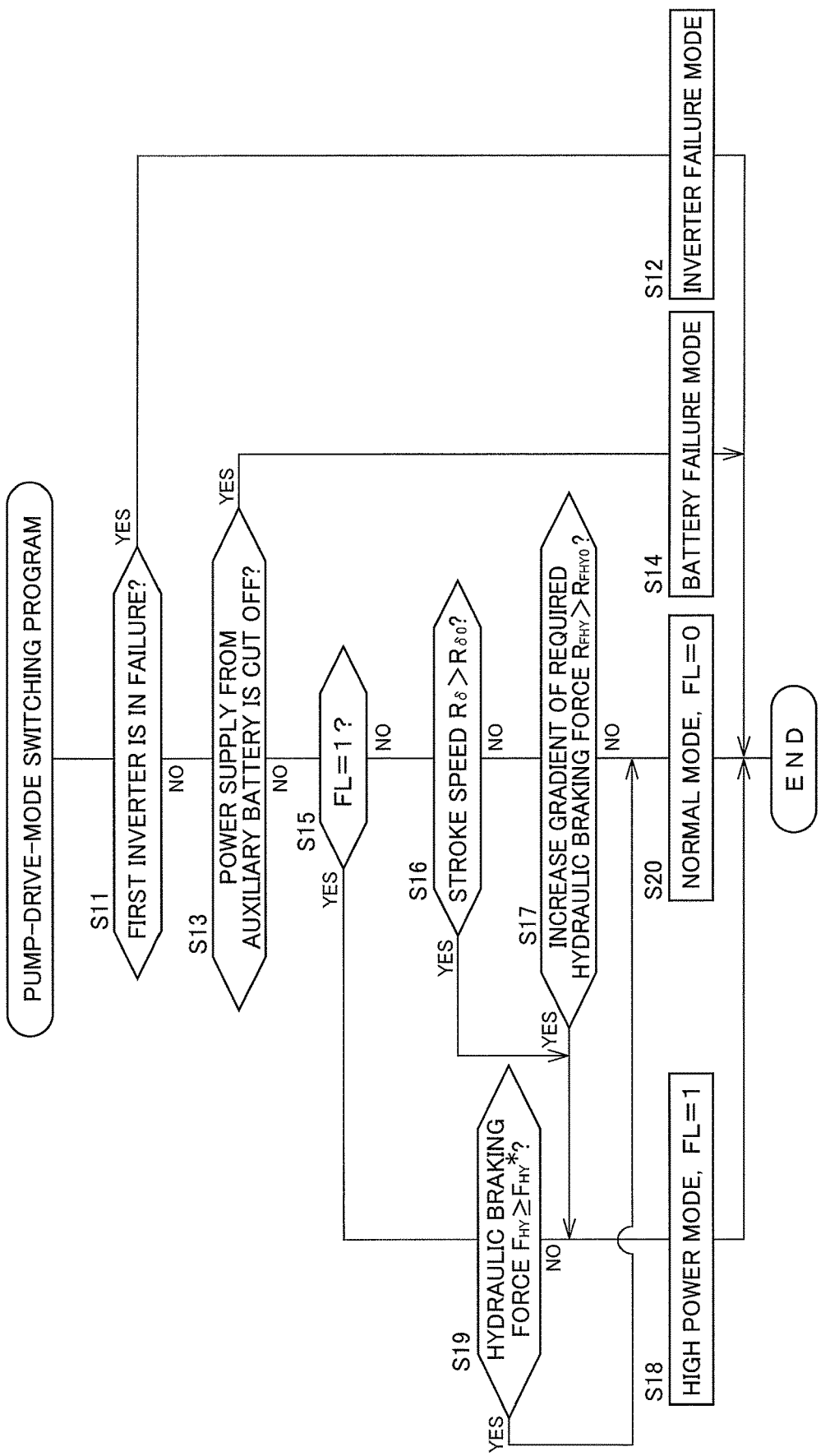
FIG. 7 is a flowchart showing a pump-drive-mode switching program executed for switching drive modes of the pump motor.

Switching of the drive modes of the pumps 60 is executed such that the HY-ECU 130 repeatedly executes a pump-drive-mode switching program shown in a flowchart of FIG. 7 at a short time pitch, e.g., several milliseconds (msec), in a time duration starting from a time point when an ignition switch of the vehicle is turned on to a time point when the ignition switch is turned off. Hereinafter, the switching of the drive modes of the pumps 60 will be specifically explained by explaining processing according to the program.

In the processing according to the pump-drive-mode switching program, it is determined at step 11 whether the first inverter 150 is in failure based on a signal sent from the first inverter 150. (Step 11 is abbreviated as "S11". Other steps are similarly abbreviated.) When it is determined that the first inverter 150 is in failure, the drive mode is set to the inverter failure mode at S12, and the pumps 60 are driven by the electric power supplied to the pump motor 62 from the auxiliary battery 124 via the third inverter 156. When it is determined that the first inverter 150 is not in failure, it is determined at S13 whether the supply of the electric power from the auxiliary battery 124 is being cut off. When the supply of the electric power from the auxiliary battery 124 is being cut off, the control flow goes to S14 at which the drive mode is set to the battery failure mode, and the pumps 60 are driven by the electric power supplied to the pump motor 62 from the capacitor 154 via the second inverter 152.

When neither the first inverter 150 nor the auxiliary battery 124 is in failure, the control flow goes to S15 at which a value of a mode flag FL is confirmed. The mode flag FL is set to "0" when the drive mode is the normal mode and to "1" when the drive mode is the high power mode. In this respect, the mode flag FL is set to "0" as an initial value when the ignition switch of the vehicle is turned on.

When it is confirmed at S15 that the mode flag FL is "0", S16 is implemented to determine whether the stroke speed $R\delta$ has exceeded the set speed $R\delta_0$ based on a detection value of the operation stroke sensor 136, and S17 is implemented to determine whether the increase gradient $R_{FHY}$ of the required hydraulic braking force has exceeded the set gradient $R_{FHY0}$. When the stroke speed $R\delta$ has exceeded the set speed $R\delta_0$ or when the increase gradient $R_{FHY}$ has exceeded the set gradient $R_{FHY0}$, the control flow goes to S18 at which the drive mode is set to the high power mode and the mode flag FL is set to "1". That is, the drive mode is switched from the normal mode to the high power mode.

When it is confirmed at S15 that the mode flag FL is "1", the control flow goes to S19 at which it is determined whether the hydraulic braking force $F_{HY}$, which is being actually generated, has reached the required hydraulic braking force $F_{HY}^*$. When it is determined that the hydraulic braking force $F_{HY}$ has reached the required hydraulic braking force $F_{HY}^*$, the control flow goes to S20 at which the drive mode is set to the normal mode and the mode flag FL is reset to "0". That is, the drive mode is switched from the high power mode to the normal mode.

What is claimed is:

1. A vehicle brake system comprising a hydraulic brake device that includes a wheel brake provided for a wheel and a brake actuator configured to supply, to the wheel brake, a working fluid having a pressure in accordance with a required hydraulic braking force,
    wherein the brake actuator includes a pump as a high-pressure source and an electric motor configured to drive the pump and including a rotation output shaft rotatably held by a housing of the electric motor, magnets attached to an outer circumference of the rotation output shaft, and a first coil and a second coil fixed to the housing so as to be opposed to the respective magnets and so as to be arranged in a direction of extension of the rotation output shaft, the electric motor being a two-system motor in which the rotation output shaft is moved by electric power supplied to any one of the first coil and the second coil or by electric power supplied simultaneously to the first coil and the second coil,
    wherein the hydraulic brake device further includes: a first battery; a first drive circuit for supplying electric power from the first battery to the first coil of the electric motor; a capacitor; and a second drive circuit for supplying electric power from the capacitor to the second coil of the electric motor,
    wherein, in a normal mode in which the pump is driven by power not greater than a set power, the electric motor drives the pump by the electric power supplied from the first battery to the first coil, and
    wherein, in a high power mode in which the pump is driven by power that exceeds the set power, the electric motor drives the pump by both of the electric power supplied from the first battery to the first coil and the electric power supplied from the capacitor to the second coil.

2. The vehicle brake system according to claim 1, wherein a part of the power by which the pump is driven in the high power mode is covered by the electric power supplied from the capacitor to the second coil, the part of the power corresponding to an excess amount beyond the set power.

3. The vehicle brake system according to claim 1, wherein the hydraulic brake device is configured such that the pump is driven by the electric power supplied from the capacitor to the second coil when the first battery is in failure.

4. The vehicle brake system according to claim 1,
    wherein the hydraulic brake device further includes a third drive circuit for supplying electric power from the first battery to the second coil of the electric motor, and
    wherein the hydraulic brake device is configured such that, when the first drive circuit is in failure, the third drive circuit is activated and the pump is prohibited from being driven in the high power mode.

5. The vehicle brake system according to claim 1, wherein the normal mode is switched to the high power mode when a gradient of increase of the required hydraulic braking force exceeds a set gradient.

6. The vehicle brake system according to claim 1, comprising a brake operation member to be operated by a driver,
wherein the required hydraulic braking force is determined in accordance with a degree of an operation of the brake operation member, and
wherein the normal mode is switched to the high power mode when a rate of increase of the degree of the operation of the brake operation member exceeds a set rate.

7. The vehicle brake system according to claim 5, wherein the high power mode is returned to the normal mode when a hydraulic braking force generated by the hydraulic brake device reaches the required hydraulic braking force.

8. The vehicle brake system according to claim 1, further comprising an electric brake device which includes another wheel brake configured to push a friction member onto a rotation body that rotates together with the wheel by advancing a plunger by an electric brake electric motor so as to generate an electric braking force that depends on a force of the electric brake electric motor,
wherein a hydraulic braking force generated by the hydraulic brake device is given to one of a front wheel and a rear wheel while the electric braking force generated by the electric brake device is given to the other of the front wheel and the rear wheel.

9. The vehicle brake system according to claim 8, wherein the electric power of the first battery is supplied also to the electric brake electric motor of the electric brake device.

10. The vehicle brake system according to claim 8, further comprising a regenerative brake device provided for one of the front wheel and the rear wheel for which one of the hydraulic brake device and the electric brake device is provided, the regenerative brake device being configured such that another electric motor for drivingly rotating the one of the front wheel and the rear wheel functions as an electric generator and electric power generated by rotation of the one of the front wheel and the rear wheel is stored, as an electric quantity, in a second battery via an inverter, so as to generate a regenerative braking force for decelerating the one of the front wheel and the rear wheel by an amount corresponding to an energy that corresponds to the stored electric quantity.

11. The vehicle brake system according to claim 1, wherein the brake actuator is not equipped with an accumulator on an ejection side of the pump.

12. The vehicle brake system according to claim 1, wherein the brake actuator includes a control valve configured to decrease a pressure of the working fluid ejected from the pump so as to adjust the pressure in accordance with the required hydraulic braking force.

* * * * *